(12) United States Patent
Choi

(10) Patent No.: US 8,207,468 B2
(45) Date of Patent: Jun. 26, 2012

(54) WELDING APPARATUS OF STAINLESS STEEL PIPE AND WELDING METHOD OF THE SAME

(75) Inventor: Jin Lim Choi, Sungnam-si (KR)

(73) Assignee: Dong-A Flexible Metal Tubes Co., Ltd., Seoul (KR)

( * ) Notice: Subject to any disclaimer, the term of this patent is extended or adjusted under 35 U.S.C. 154(b) by 756 days.

(21) Appl. No.: 12/294,644

(22) PCT Filed: Mar. 26, 2007

(86) PCT No.: PCT/KR2007/001455
§ 371 (c)(1),
(2), (4) Date: Jan. 15, 2009

(87) PCT Pub. No.: WO2007/111453
PCT Pub. Date: Oct. 4, 2007

(65) Prior Publication Data
US 2010/0224595 A1 Sep. 9, 2010

(30) Foreign Application Priority Data
Mar. 29, 2006 (KR) .................. 10-2006-0028647

(51) Int. Cl.
*B23K 11/00* (2006.01)
*B23K 31/02* (2006.01)

(52) U.S. Cl. .................. 219/59.1; 219/61.7; 219/61

(58) Field of Classification Search ............... 219/59.1, 219/61.7, 61, 72, 74, 76.1, 76.11, 60 R; 228/219; 405/169, 170
See application file for complete search history.

(56) References Cited

U.S. PATENT DOCUMENTS

| | | | | |
|---|---|---|---|---|
| 3,219,789 A | * | 11/1965 | Branch et al. | 219/60 R |
| 3,922,186 A | * | 11/1975 | Segawa et al. | 156/310 |
| 4,231,991 A | * | 11/1980 | Muller | 422/245.1 |
| 4,902,359 A | * | 2/1990 | Takeuchi et al. | 148/222 |
| 5,299,731 A | * | 4/1994 | Liyanage et al. | 219/121.33 |
| 5,669,547 A | * | 9/1997 | Spring | 228/219 |
| 5,900,079 A | * | 5/1999 | Ono et al. | 148/519 |
| 6,399,915 B1 | * | 6/2002 | Mori et al. | 219/121.83 |
| 6,417,477 B1 | * | 7/2002 | Brown et al. | 219/76.13 |
| 7,114,881 B2 | * | 10/2006 | Belloni et al. | 405/170 |
| 7,246,736 B2 | * | 7/2007 | Wang et al. | 219/74 |

FOREIGN PATENT DOCUMENTS

| | | |
|---|---|---|
| JP | 5-318111 A | 12/1993 |
| JP | 5318111 | * 12/1993 |
| JP | 8-71779 A | 3/1996 |
| JP | 9-122907 A | 5/1997 |

* cited by examiner

*Primary Examiner* — Timothy J Dole
(74) *Attorney, Agent, or Firm* — Birch, Stewart, Kolasch & Birch, LLP

(57) ABSTRACT

A welding apparatus of a stainless steel pipe comprises a welding torch jetting argon gas for shielding oxygen into a gap of the steel pipe rolled in a circular shape, while fusing any one of base metal and a welding material; and a gas supply pipe installed inside the steel pipe, the gas supply pipe having a jetting nozzle which jets argon gas at a rate of 4 to 20 l/min toward the inner surface of a welding bead portion, where welding has been already completed and which is positioned backwardly at a predetermined distance from a welding bead portion where welding is being performed by the welding torch.

12 Claims, 3 Drawing Sheets

[Figure 1]
RELATED ART
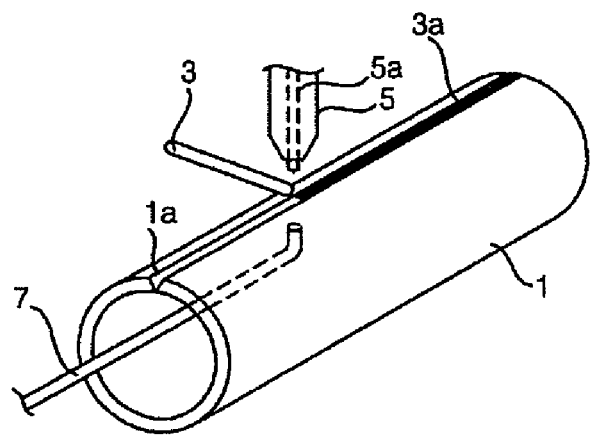
[Figure 2]
RELATED ART
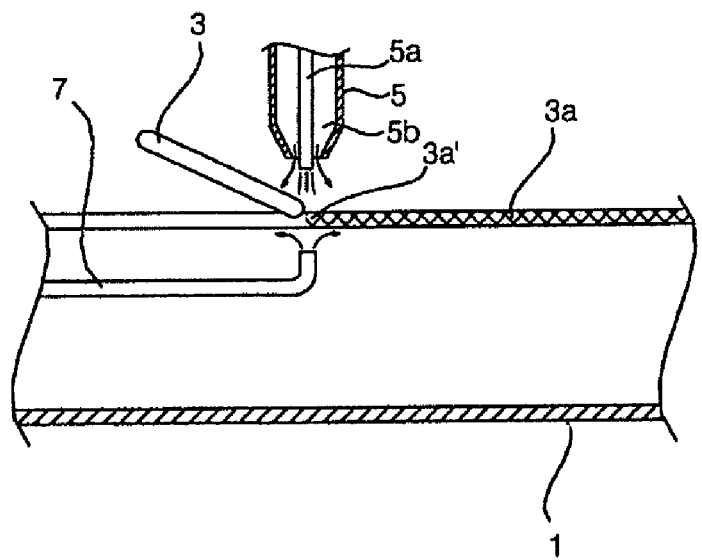

[Figure 3]
RELATED ART
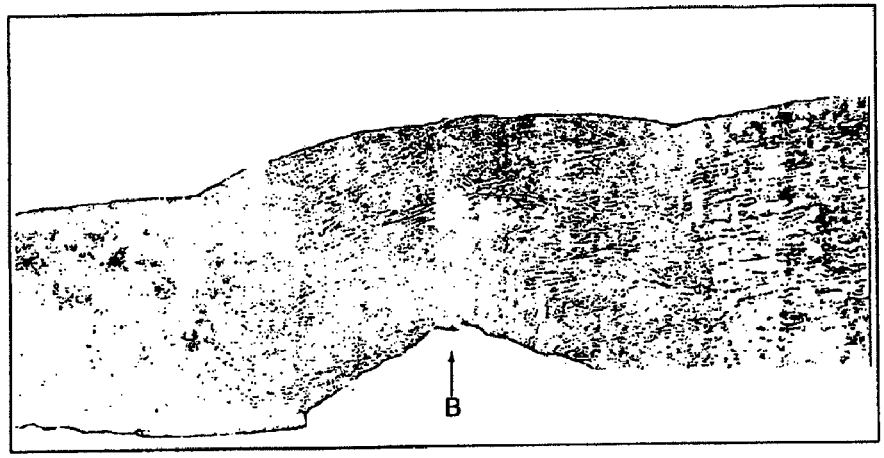
[Figure 4]
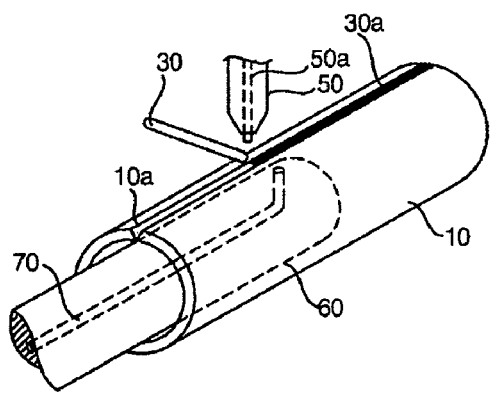

[Figure 5]
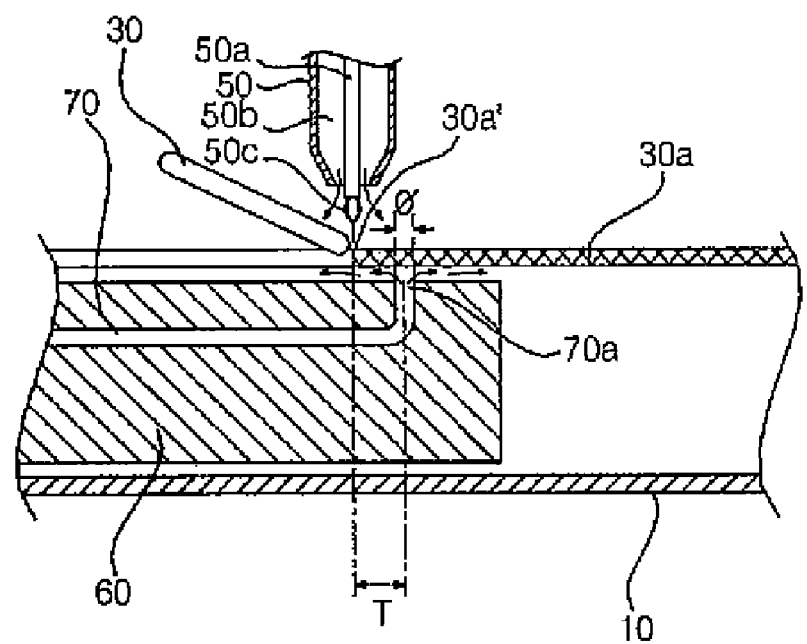

WELDING APPARATUS OF STAINLESS STEEL PIPE AND WELDING METHOD OF THE SAME

TECHNICAL FIELD

The present invention relates to a welding apparatus of a stainless steel pipe and a welding method of the same, which weld a gap in a steel plate rolled in a circular shape so as to produce a stainless steel pipe.

BACKGROUND ART

Generally, in a welding apparatus of stainless steel pipe and a welding method of the same, a stainless steel plate with a predetermined thickness is rolled in a circular shape, and a welding material is fused to weld a V-shaped gap formed between joining portions at both ends of the steel plate rolled in a circular shape so as to continuously produce a stainless steel pipe. When the steel pipe has a small thickness, base metal is fused to perform welding.

FIG. 1 is a perspective view of a conventional welding apparatus of a stainless steel pipe. FIG. 2 is a cross-sectional view of the conventional welding apparatus of FIG. 2. Referring to FIGS. 1 and 2, the conventional welding apparatus generates arc from an electrode rod 5a of a plasma or TIG (Tungsten Inert Gas) welding torch 5 so as to fuse base metal or a welding material 3 positioned at a gap 1a between joining portions of a steel pipe 1 rolled in a circular shape. Then, the base metal or welding material 3 is deposited into the gap 1a to form a welding bead portion 3a, thereby completing the formation of pipe.

In this case, in order to prevent the welded portion from coming in contact with oxygen and being then oxidized, inert argon gas stored in a gas storage container (not shown) is jetted onto the surface of the welding bead portion through the inner space 5b of the TIG welding torch 5 and is also jetted onto the inner surface of a welding bead portion positioned inside the steel pipe 1 through a gas supply pipe 7, as shown in FIG. 2. Then, the welding bead portions 3a inside and outside the steel pipe are shielded from the air so as not to come in contact with oxygen, and thus the welding bead portions are prevented from being oxidized.

Further, while the steel pipe 1 is transferred in a state where the welding torch 5 and the gas supply pipe 7 are fixed, or while the welding torch 5 and the gas supply pipe 7 are transferred in a state where the steel pipe 1 is fixed, the steel pipe 1 is continuously welded.

Meanwhile, the position where inert argon gas is jetted onto the welding bead portion 3a' inside the steel pipe by the gas supply pipe 7 is located right under the portion of the welding torch 5 where arc is generated. Therefore, when a jetted amount of argon gas is increased so that the welding bead portion fused at a temperature of more than 1,350° C. is rapidly cooled, a concave groove is formed around the inner welded portion by a jetting force of the argon gas, as shown in FIG. 3. Further, the base metal is cooled so that the deposition of fused metal is reduced, and welding stress occurring in the welding bead portion and welding-heat-influenced portion is not removed. In addition, intergranular corrosion is promoted in the welding bead portion and the welding-heat-influenced portion such that carbide is educed.

As for a conventional welding method of stainless steel pipe, there is provided a method in which inert argon gas is widely jetted across the front and rear side of a portion of a welding torch where arc is generated. In this method, however, the above-described problems occur.

Meanwhile, as for work-hardening or welding-stress annealing temperature of austenitic stainless steel which is commonly used for manufacturing a stainless steel pipe, 1,050° C. is proper. The temperature range of sensitization where carbide promoting intergranular corrosion is educed is 425 to 870° C. Therefore, in order to perform annealing after a steel pipe is manufactured, the steel pipe should be heated up to a temperature of 1,050 to 1,150° C. and should be then cooled down to a temperature of less than 425° C. In this case, when plasma or TIG welding is performed, the fusing temperature of a welding material typically ranges from 1,350 to 1,500° C. However, the welding bead portion and the welding-heat-influenced portion is slowly cooled after the welding. Therefore, welding stress is not removed, and carbide is educed.

When the hardness of the steel pipe welded according to the conventional welding method is measured, the hardness of the welding bead portion and the welding-heat-influenced portion is higher (as much as 50-100%) than that of base metal. Therefore, because of a metal structure divided into an austenitic structure and a martensitic structure, corrosion caused by a potential difference inevitably occurs.

When an amount of argon gas jetted onto the welding bead portion 3a' inside the steel pipe, positioned right under the arc generation position of the welding torch 5, from the gas supply pipe 7 is increased more than two times, relatively high-pressure and high-temperature argon gas is directly jetted onto the welding bead portion 3a', which is still fused, such that a dent portion B is formed toward the outer surface of the still pipe, as shown in FIG. 3, because the temperature of the argon gas, which is evaporated from liquefied gas through an evaporator and jetted, is as low as 10° C. Further, since the welding bead portion is rapidly cooled in a state where the base metal is not sufficiently deposited, imperfect welding occurs, and cracks occur in the welded portion in a severe case.

DISCLOSURE

Technical Problem

The present invention has been finalized to solve the problems, and an advantage of the present invention is that it provides a welding apparatus of a stainless steel pipe and a welding method of the same, which can prevent a welded portion from being oxidized and achieve a heat solution treatment effect in a welding bead portion and a welding-heat-influenced portion, when TIG or plasma welding of the steel pipe is performed. With this, physical properties of the welding bead portion and the welding-heat-influenced portion of the steel pipe, such as hardness, corrosion resistance and the like, becomes identical to those of base metal of the steel pipe.

Technical Solution

According to an aspect of the invention, a welding apparatus of a stainless steel pipe comprises a welding torch jetting argon gas for shielding oxygen into a gap of the steel pipe rolled in a circular shape, while fusing any one of base metal and a welding material; and a gas supply pipe installed inside the steel pipe, the gas supply pipe having a jetting nozzle which jets argon gas at a rate of 4 to 20 l/min toward the inner surface of a welding bead portion, where welding has been already completed and which is positioned backwardly at a predetermined distance from a welding bead portion where welding is being performed by the welding torch. Preferably, the jetting nozzle is positioned backwardly at a distance of 5 to 8 mm from the welding bead portion.

According to another aspect of the invention, a welding method of a stainless steel pipe, in which base metal or a welding material is fused to weld a gap in the steel pipe by using a welding torch, while argon gas for shielding oxygen is jetted, comprises jetting argon gas at a rate of 4 to 20 l/min toward the inner surface of a welding bead portion, where welding has been already completed so that the welding bead portion is solidified and which is positioned backwardly at a predetermined distance from a welding bead portion, where welding is being performed by the welding torch, the welding bead portion being formed in the gap of the steel pipe by fusing any one of the base metal or welding material; and spreading the jetted argon gas toward the inner surface of the welding bead portion where welding is performed by the welding torch.

Advantageous Effects

According to the invention, the oxidation of the welded portion is prevented, and simultaneously, the welding bead portion where welding has been completed is rapidly cooled so that a solution heat treatment process is automatically performed. Therefore, it is possible to continuously produce a stainless steel pipe having the same physical properties (such as hardness, corrosion resistance and the like) as base metal of the steel pipe.

DESCRIPTION OF DRAWINGS

FIG. 1 is a perspective view of a conventional welding apparatus of a stainless steel pipe.

FIG. 2 is a cross-sectional view of the conventional welding apparatus of FIG. 2.

FIG. 3 is a tomographic photograph of a welding bead portion welded according to a conventional welding method of a stainless steel pipe.

FIG. 4 is a perspective view of a welding apparatus of a stainless steel pipe according to the invention, showing a welding method of the same.

FIG. 5 is a cross-sectional view of the welding apparatus of FIG. 4.

BEST MODE

Hereinafter, an embodiment according to the present invention will be described in detail with reference to the drawings.

FIG. 4 is a perspective view of a welding apparatus of a stainless steel pipe according to the invention, showing a welding method of the same. FIG. 5 is a cross-sectional view of the welding apparatus of FIG. 4. Referring to FIGS. 4 and 5, the welding apparatus of a stainless steel pipe serves to weld a gap in the steel pipe, formed by rolling a steel plate in a circular shape, by using high-temperature heat generated from an arc generating section $50c$ or a plasma supply section positioned at the end of an electrode $50a$ of a welding torch $50$. When the steel plate has a small thickness, the welding is performed by fusing base metal. When the steel plate has a large thickness, the welding is performed by fusing a welding material $30$. In this case, a copper rod $60$ can be used to easily roll the steel plate in a circular shape. In the gape in the steel pipe rolled in a circular shape, a welding bead portion $30a$ is formed and deposited by the fused base metal or welding material $30$.

On the surface of a welding bead portion $30a'$ where welding is being performed by the welding torch $50$, argon gas for shielding oxygen is jetted through an inner space $50b$ of the welding torch $50$. Further, the argon gas for shielding oxygen is also jetted onto the inner surface of the welding bead portion $30a$ through a gas supply pipe $70$.

In particular, a jetting nozzle $70a$ which jets argon gas from the gas supply pipe $70$ is positioned to be spaced at a predetermined distance T from the welding bead portion, where welding has been already completed so that the welding bead portion is solidified and which is positioned backwardly from the welding bead portion $30a'$ on which welding is being performed by the welding torch $50$. The argon gas is jetted toward the welding bead portion $30a$ inside the steel pipe where welding has been already completed. Then, the jetted argon gas spreads while grazing the inner surface of the welding bead portion $30a'$ where welding is being performed.

Preferably, as a result of testing, the distance T between the arc generating section $50c$ of the welding torch and the jetting nozzle $70a$ of the gas supply pipe $70$ is equal to or more than 7 mm and equal to or less than 8 mm when the thickness of the steel plate is equal to or more than 0.15 mm and less than 0.5, equal to or more than 5.5 mm and less than 7 mm when the thickness of the steel plate is equal to or more than 0.5 mm and less than 1.2 mm, and equal to or more than 5 mm and equal to or less than 5.5 mm when the thickness of the steel plate is equal to or more than 1.2 mm.

Hereinafter, the operation of the welding apparatus of a stainless steel pipe, constructed in such a manner, according to the invention will be described.

In the welding apparatus of a stainless steel pipe according to the invention, the jetting nozzle $70a$ of the gas supply pipe $70$, which jets argon gas for shielding oxygen onto the inner surface of the welding bead portion $30a$ formed in the gap of the steel pipe, is positioned backwardly so as to be spaced at a distance of 5 to 8 mm from the welding head portion $30a'$ where welding is being performed by the welding torch $50$. Therefore, since relatively high-pressure argon gas is jetted onto the welding bead portion which has been already solidified, the inner surface of the welding bead portion is not likely to be dented by the argon gas jetted onto the inner surface of the welding bead portion. Accordingly, it is possible to jet a large amount of argon gas.

Preferably, as a result of testing, an amount of argon gas to be jetted onto the inner surface of the welding bead portion is equal to or more than 4 l/min and less than 6 l/min when the thickness of the steel plate is equal to or more than 0.15 mm and less than 0.5 m, equal to or more than 6 l/min and less than 10 l/min when the thickness of the steel plate is equal to or more than 0.5 mm and less than 1.2 mm, and equal to or more than 10 l/min and equal to or less than 20 l/min when the thickness of the steel plate is equal to or more than 1.2 mm, at a jetting pressure of $0.5 \pm 0.2$ kg/cm$^2$. In this case, the diameter of the jetting nozzle $70a$ is preferably set to $1.0 \pm 0.5$ mm.

Further, the low-temperature argon gas jetted onto the inner surface of the welding bead portion, of which the temperature is about 10° C., is jetted onto the inner surface of the welding bead portion which has been already solidified. Therefore, the fused welding bead portion $30a'$ is prevented from being defectively welded.

In addition, since the fusing temperature of TIG welding ranges from 1,350 to 1,500° C., low-temperature argon gas for shielding oxygen is jetted through the jetting nozzle $70a$ positioned at a portion spaced at a distance of 5 to 8 mm from the welding torch, where the temperature of the welding bead portion $30a'$ and the welded portion of the steel pipe has decreased to 1,050° C., such that the welding bead portion and a welding-heat-influenced portion are rapidly cooled into a temperature of less than 425° C. which is the lowest sensitizing temperature of stainless steel. Therefore, as the argon gas for shielding oxygen is jetted, a solution heat treatment process is automatically performed, so that welding stress of the welding bead portion and the welding-heat-influenced portion is removed without a separate solution heat treatment process. Further, the education of carbide is reduced.

Table 1 shows welding conditions in the welding apparatus of a stainless steel pipe according to the invention.

TABLE 1

| Division | Sample A | Sample B | Sample C |
| --- | --- | --- | --- |
| Thickness | More than 0.15 mm Less than 0.5 mm | More than 0.5 mm Less than 1.2 mm | More than 1.2 mm |
| Transfer speed of steel pipe | 8 m/min | 6 m/min | 4 m/min |
| Temperature of argon gas | 10 ± 5° C. | Same as the left field | Same as the left field |
| Jetted amount of argon gas | More than 4 l/min Less than 6 l/min | More than 6 l/min Less than 10 l/min | More than 10 l/min Less than 20 l/min |
| Jetting pressure of argon gas | 0.5 ± 0.2 kg/cm | Same as the left field | Same as the left field |
| Distance between copper rod and inner surface of steel pipe | Outer diameter of copper rod is smaller (as much as 0.6 mm) than inner diameter of steel pipe | Same as the left field | Same as the left field |
| Diameter of jetting nozzle | 1.0 ± 0.5 mm | Same as the left field | Same as the left field |
| Welding temperature | 1,300~1,450° C. | Same as the left field | Same as the left field |
| Distance from jetting nozzle | More than 7 mm Less than 8 mm | More than 5.5 mm Less than 7 mm | More than 5 mm Less than 5.5 mm |

In Table 1, Sample A represents a stainless steel pipe of which the thickness is equal to or more than 0.15 mm and less than 0.5 mm, Sample B represents a stainless steel pipe of which the thickness is equal to or more than 0.5 mm and less than 1.2 mm, and Sample C represents a stainless steel pipe of which the thickness is more than 0.5 mm. Depending on the thickness of the steel pipe, the jetting nozzle is spaced at a distance of 5 to 8 mm from the welding bead portion 30a' where welding is being performed, a jetted amount of argon gas is set to 4 to 20 l/min, the temperature of the argon gas is set to 10° C., and the jetting pressure of the argon gas is set to 0.5 kg/cm$^2$ such that an optimal stainless steel pipe can be formed.

In addition, the steel pipe 10 is continuously welded while being transferred at speed of 4 to 8 m/min depending on the thickness of the steel pipe 10 in a state where the welding torch 50 and the gas supply pipe 70 are fixed or while the welding torch 50 and the gas supply pipe 70 are transferred at the same speed in a state where the steel pipe 10 is fixed. Then, it is possible to continuously produce stainless steel.

Table 2 shows Vickers hardness (HV) measured in each portion of the stainless steel pipe formed under the welding condition of FIG. 1. Vickers hardness can be measured using a Vickers hardness tester or the like.

TABLE 2

| Division | Sample A | Sample B | Sample C |
| --- | --- | --- | --- |
| Welding bead portion | HV = 173 | HV = 180 | HV = 182 |
| Welding-heat-influenced portion | HV = 171 | HV = 179 | HV = 178 |
| Opposite portion to welding bead portion | HV = 170 | HV = 173 | HV = 173 |

In Table 2, the welding-heat-influenced portion indicates a region within 5 mm in the left and right side of the welding bead portion. As shown in Table 2, it can be found that, when a stainless steel pipe is formed using the welding apparatus according to the invention under the welding condition of Table 1, the hardness of the welding bead portion and the welding-heat-influenced portion is almost the same as that of base metal. Therefore, the entire stainless steel pipe is formed to have almost uniform hardness.

While the present invention has been described with reference to exemplary embodiments thereof, it will be understood by those skilled in the art that various changes and modifications in form and detail may be made therein without departing from the scope of the present invention as defined by the following claims.

Industrial Applicability

According to the invention, the gap in the steel pipe is welded while the argon gas for shielding oxygen is jetted onto the welding bead portion, and the argon gas is jetted onto a portion spaced at a predetermined distance from the welding bead portion, where welding is being performed by the welding torch, toward the welding bead portion where welding has been already completed so that the welding bead portion is solidified. Then, the jetted argon gas spreads toward the welding bead portion where the welding is being performed. Therefore, the oxidation of the welded portion is prevented by the argon gas, and simultaneously, the welding bead portion and the welding-heat-influenced portion are rapidly cooled so that a solution heat treatment process is automatically performed. Therefore, welding stress is removed, and the education of oxide is prevented. Further, under the welding condition according to the invention, stainless steel having the same physical properties (such as the hardness of the welding bead portion and the welding-heat-influenced portion and the like) as base metal of the steel pipe can be continuously produced.

The invention claimed is:

1. A welding apparatus of a stainless steel pipe comprising:
   a welding torch jetting argon gas for shielding oxygen into a gap of the steel pipe rolled in a circular shape, while fusing at least one of a base metal and a welding material; and
   a gas supply pipe installed inside the steel pipe, the gas supply pipe having a jetting nozzle which jets argon gas at a rate of 4 to 20 l/min toward an inner surface of a welding bead portion formed at the gap of the steel pipe, where welding has been already completed and which is positioned backwardly at a predetermined distance from a welding bead portion where welding is being performed by the welding torch such that the argon gas jetted from the jetting nozzle cools and solidifies the welding bead portion where welding has been already completed and then, spreads towards the inner surface of the welding bead portion, where welding is being performed, for preventing the inner surface of the welding bead portion from being oxidized.

2. The welding apparatus according to claim 1, wherein the jetting nozzle is positioned backwardly at a distance of 5 to 8 mm from the welding bead portion where welding is being performed by the welding torch.

3. The welding apparatus according to claim 1, wherein the jetting pressure of the argon gas is 0.5±0.2 kg/cm2.

4. The welding apparatus according to claim 1, wherein the diameter of the jetting nozzle is 1.0±0.5 mm.

5. The welding apparatus according to claim 1, wherein the temperature of the argon gas is 10±5° C.

6. The welding apparatus according to claim 1, wherein the steel pipe is transferred at speed of 4 to 8 m/min.

7. A method for welding a stainless steel pipe in which a base metal and/or a welding material is fused to weld a gap of the steel pipe by using a welding torch, while argon gas for shielding oxygen is jetted, the welding method comprising:

jetting argon gas at a rate of 4 to 20 l/min toward an inner surface of a welding bead portion, where welding has been already completed so that the welding bead portion is cooled and solidified and which is positioned backwardly at a predetermined distance from a welding bead portion, where welding is being performed by the welding torch, the welding bead portion being formed at the gap of the steel pipe by fusing the base metal and/or the welding material; and spreading the jetted argon gas toward the inner surface of the welding bead portion where welding is performed by the welding torch such that the inner surface of the welding bead portion is prevented from being oxidized.

8. The welding method according to claim 7, wherein the argon gas is jetted onto the rear side spaced at a distance of 5 to 8 mm from the welding bead portion where welding is being performed by the welding torch.

9. The welding method according to claim 7, wherein the jetting pressure of the argon gas is 0.5±0.2 kg/cm2.

10. The welding method according to claim 7, wherein the diameter of the jetting nozzle is 1.0±0.5 mm.

11. The welding method according to claim 7, wherein the temperature of the argon gas is 10±5° C.

12. The welding method according to claim 7, wherein the steel pipe is transferred at speed of 4 to 8 m/min.

* * * * *